(12) United States Patent
Mashayekhi

(10) Patent No.: US 7,231,517 B1
(45) Date of Patent: Jun. 12, 2007

(54) APPARATUS AND METHOD FOR AUTOMATICALLY AUTHENTICATING A NETWORK CLIENT

(75) Inventor: Cameron Mashayekhi, Provo, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 09/518,664

(22) Filed: Mar. 3, 2000

(51) Int. Cl.
*G06F 7/02* (2006.01)
*G06F 15/16* (2006.01)
*H04L 9/08* (2006.01)
*H04L 9/00* (2006.01)

(52) U.S. Cl. .................. 713/167; 709/229; 713/55; 726/8; 726/10

(58) Field of Classification Search ........... 713/155, 713/153, 202, 161, 169, 183, 184, 171; 380/229, 380/259, 281, 283, 284, 282, 29; 705/67, 705/18; 455/410
See application file for complete search history.

(56) References Cited

U.S. PATENT DOCUMENTS

| | | | | |
|---|---|---|---|---|
| 5,202,922 A | * | 4/1993 | Iijima ..................... | 380/45 |
| 5,469,507 A | * | 11/1995 | Canetti et al. ............ | 380/30 |
| 5,535,276 A | * | 7/1996 | Ganesan .................. | 713/155 |
| 5,638,444 A | * | 6/1997 | Chou et al. ............... | 380/284 |
| 5,684,950 A | * | 11/1997 | Dare et al. ............... | 713/201 |
| 5,689,565 A | * | 11/1997 | Spies et al. .............. | 713/189 |
| 5,784,566 A | * | 7/1998 | Viavant et al. ........... | 709/229 |
| 5,818,936 A | * | 10/1998 | Mashayekhi .............. | 713/167 |
| 5,825,890 A | * | 10/1998 | Elgamal et al. ........... | 713/151 |
| 5,892,828 A | * | 4/1999 | Perlman .................. | 713/183 |
| 6,212,280 B1 | * | 4/2001 | Howard et al. ........... | 380/279 |
| 6,243,816 B1 | * | 6/2001 | Fang et al. ............... | 713/202 |
| 6,275,944 B1 | * | 8/2001 | Kao et al. ................ | 713/202 |
| 6,307,936 B1 | * | 10/2001 | Ober et al. ............... | 380/30 |
| 6,401,206 B1 | * | 6/2002 | Khan et al. ............... | 713/176 |

OTHER PUBLICATIONS

Alfred J. Menezes, et al, Handbook of Applied Cryptography, 1997, CRC Press LLC, section 7.4 DES, 12.2.2.*
Hickman, Kipp E. B., The SSL Protocol, Nov. 19, 1994, Netscape Communications Corp.*
Michener, John R. and Acar, Tolga, Security Domains: Key Management in Large-Scale Systems, Sep./Oct. 2000, IEEE Software.*
Menezes, "Handbook of Applied Cryptography," 1997, pp. 494, 515, and 516.*

* cited by examiner

*Primary Examiner*—Gilberto Barrón, Jr.
*Assistant Examiner*—Matthew Heneghan
(74) *Attorney, Agent, or Firm*—Schwegman, Lundberg, Woessner & Kluth, P.A.

(57) ABSTRACT

A distributed authentication system includes a cryptography service node, and a client node interface coupled to a network authentication database, for providing automatic authentication to enable the client node to access network resources, such as applications or services, resident in one or more network server nodes. Authentication secrets corresponding to the network resources are each encrypted with a respective strong key and stored in the authentication database. Authentication of the client node is accomplished with the retrieval of an authentication secret corresponding to a requested network resource. The retrieval process includes: i) decrypting the authentication secret using the strong key and encrypting the secret using a second key, and ii) sending a copy of the second key encrypted with a third key along with the encrypted secret to the requesting client node via a communication medium.

20 Claims, 15 Drawing Sheets

APPARATUS AND METHOD FOR AUTOMATICALLY AUTHENTICATING A NETWORK CLIENT

BACKGROUND OF THE INVENTION

1. Field of the Invention

The present invention relates generally to the use of cryptography in a distributed data processing system and, more specifically, to an apparatus and method for transparently authenticating a client to multiple services and applications in such a distributed system.

2. Background Information

In a distributed data processing network system, the methodology employed to reliably verify the identity of a communicating device across the network prior to allowing the device to access system operations and resources is referred to as authentication. Access to the system may be needed for the purpose of, for example, communicating with other clients, retrieving secure information, or receiving a service. Distributed systems generally include various computer nodes interconnected by a communications medium. The computer nodes may include client nodes that are directly accessed by clients, e.g., workstations, and server nodes running specialized applications. These nodes, the processes running on these nodes, and the clients of the distributed system are commonly referred to as 'principals.' The authentication exchange is performed on behalf of the principals.

Some conventional network systems have been designed to reduce the number of authentication exchanges required. One method is to use a set of passwords in a configuration referred to as a 'keychain.' The operating system incorporates the keychain and the client gains access to the network services by using a keychain password at the time his workstation is booted.

However, this approach provides for only one keychain per operating system, or per workstation. This localized feature of the keychain precludes its use with other workstations or systems in the distributed network system. Moreover, the use of a single keychain results in a single level of access control to all application programs in the system for a given workstation and does not provide for different access rights in different applications for the client. The method stores client names and passwords only for network-based services and not for application programs. Thus, although single password access is provided to services, the client is required to authenticate himself to each program that is accessed thereafter.

In another conventional method, the client enters a single password when logging into the distributed data processing network system. In this method, a service is available only as part of the operating system of each local workstation, and is therefore not provided on the network as a distributed service. Moreover, this conventional service does not provide for passwords of choice for application programs or for network logins, but rather requires that all services accessed by the workstation synchronize their respective passwords with the platform password. If a client assigns the same value to all passwords, his rights to the applications are given away if his common password is compromised.

It can thus be seen from the foregoing that the conventional approaches to simplifying the authentication process have limited capabilities and flexibility. What is needed, therefore, is an apparatus and method for automatically authenticating a client to one or more selected application programs or services in a distributed network without compromising the security of the network or the confidentiality of the client's information.

SUMMARY OF THE INVENTION

The present invention relates to a distributed authentication system that provides for automatically authenticating a client to one or more requested resources in a distributed network system. The distributed authentication system includes a cryptography service node which provides various keys and algorithms for encryption and decryption, and an authentication database which includes authentication data and resources for encryption and decryption. After logging on, a valid client can transmit a request to access a network resource. The requested network resource responds by inquiring as to the authorization for access.

A local application program interface accesses the authentication database, in response to the authentication inquiry, and encrypts the corresponding authentication secret with a common key. The common key is subsequently encrypted with a session key, and the encrypted authentication secret and session key are forwarded to the client node with the session key for decrypting the common key used to decrypt the authentication secret. When decrypted, the authentication secret is forwarded to the requested network resource server.

If the requesting user were new to the distributed authentication system, the local application program interface would have prompted the user for authentication information, which information would then be stored in the authentication database. On subsequent requests by the user for the network resource, the distributed authentication system retrieves the authentication information from the authentication database without prompting the user.

Because the authentication system is a distributed system, the user can access various network resources from any of a number of client nodes in the distributed network system and not be limited to application programs resident in one client node. Moreover, the distributed authentication system provides for access to both application programs and services alike, and is not limited to network-based applications. Further features and advantages of the present invention as well as the structure and operation of various embodiments of the present invention are described in detail below with reference to the accompanying drawings.

BRIEF DESCRIPTION OF THE DRAWINGS

The invention description below refers to the accompanying drawings, of which.

DETAILED DESCRIPTION OF AN ILLUSTRATIVE EMBODIMENT

Introduction

Figure 1:
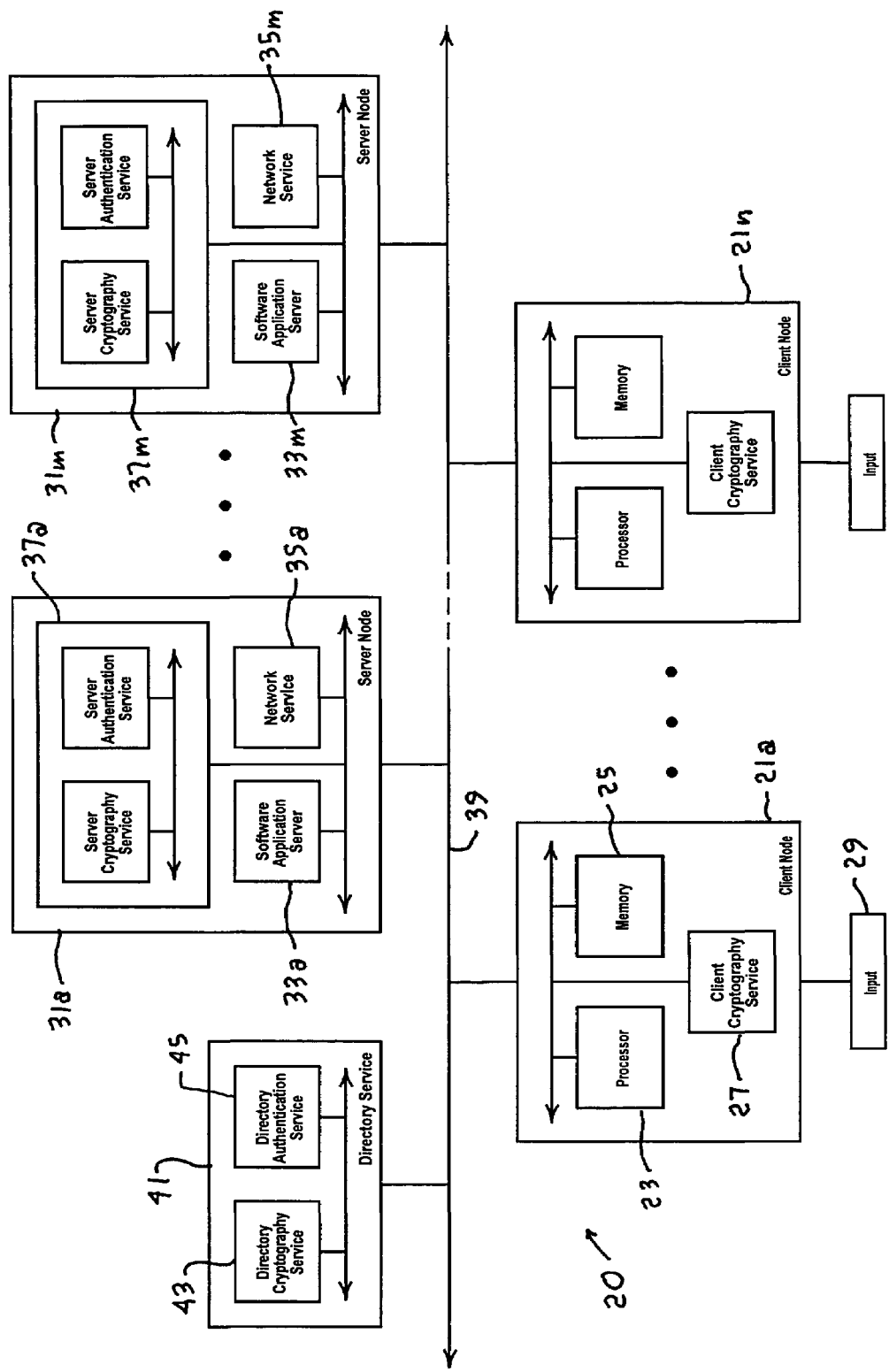
FIG. 1 is a conventional distributed data processing network system.

A conventional distributed data processing network system 20, shown in FIG. 1, includes a plurality of client nodes 21a, . . . , 21n, and various server nodes 31a, . . . , 31m interconnected by a communication medium 39. The server node 31a, for example, may be a network resource running a software application 33a and a network service 35a for use by one or more of the client nodes 21a, . . . , 21n. The client node 21a, for example, may be a workstation including a processor 23, a memory 25, and a client cryptography service 27 configured for a single user via an input device 29. As understood by one skilled in the relevant art, the term 'user' is not limited to a human user and may also include, for example, a network service functioning as the user.

To access the resources of the data processing network system 20, the user may 'log on' at the client node 21a via the input 29 to establish connection with a directory service 41. The directory service 41 typically includes a directory cryptography service 43 and a directory authentication service 45. There may also be provided one or more directory services, such as a server directory service 37a in the server node 31a or a server directory service 37m in the server node 31m. After the user has logged on, he must be remotely authenticated to the directory service 41, for example, before he can acquire access to the network resources. To obtain authentication, the user first provides an authorized user identity (e.g., a user name) and a user secret (e.g., a password). The client node 21a subsequently derives a secret, non-complimentary, user encryption key by using the client cryptography service 27 to apply a pre-determined hash function with a known salt to the user secret.

The client node 21a then requests the user private key from the directory service 41. Previous to this request, the user private key had been encrypted under the user encryption key and was subsequently stored as a 'credential' of the directory service which includes a table entry correlating the user name with the user encrypted private key. In response to the request from the client node 21a, the directory service 41 returns the user encrypted private key. The client node 21a decrypts the user encrypted private key with the user encryption key. The decrypted user private key is used in subsequent authentication exchanges with remote principals including the server nodes 31a, . . . , 31m and other clients, exemplified by the client node 21n.

Access to the data processing network system 20 is granted after the user at the client node 21a has been authenticated by the directory service 41. With access granted, the user may subsequently attempt to access other network-based services or applications such as a software application 33m or a network service 35m, for example. Upon successful authentication to the directory, the client node 21a is issued a proof of authentication (i.e., a credential or service ticket). This proof of authentication is used by the client node 21a in conjunction with a connection identifier to the server that holds the portion of a directory tree on which the user's information resides. Since the directory is a distributed system, the partitions can be master copies or replicas of a master copy. As is known in the relevant art, directory partitions can be replicated to provide locale independence and seamless user access on a network. The client cryptographic service 27 in the client node 21a will request a session key from the server cryptographic service holding the directory partition providing the user's credentials. A key generator resident in the server cryptographic service associated with the directory partition will issue the session key (if symmetric), or keys (if asymmetric), at this stage and will transmit the user's copy to the client node 21a using a secure method known in the relevant art. See, for example, "Security Domains: Key Management in Large-Scale Systems with Application to Directories," by J. R. Michner and T. Acar, incorporated herein by reference in its entirety.

In a conventional system, the attempt to access other network-based services or applications typically requires the procedure of logging on to a different network or accessing a different operating system. As can be appreciated by one skilled in the relevant art, each network, each application server, and each operating system is correlated to its own authentication agent which maintains the identities and secrets of authorized users. Accordingly, the user may be repeatedly queried for the password with each subsequent attempt to access a new network resource since the authentication agent for the new resource will have had no information as to any previous authorization for the user. These additional access attempts and queries can consume considerable system bandwidth and can be quite inconvenient for the user, particularly in a network system in which authentication is required each time the user requests access to a new resource.

DESCRIPTION OF A PREFERRED EMBODIMENT

Figure 2:
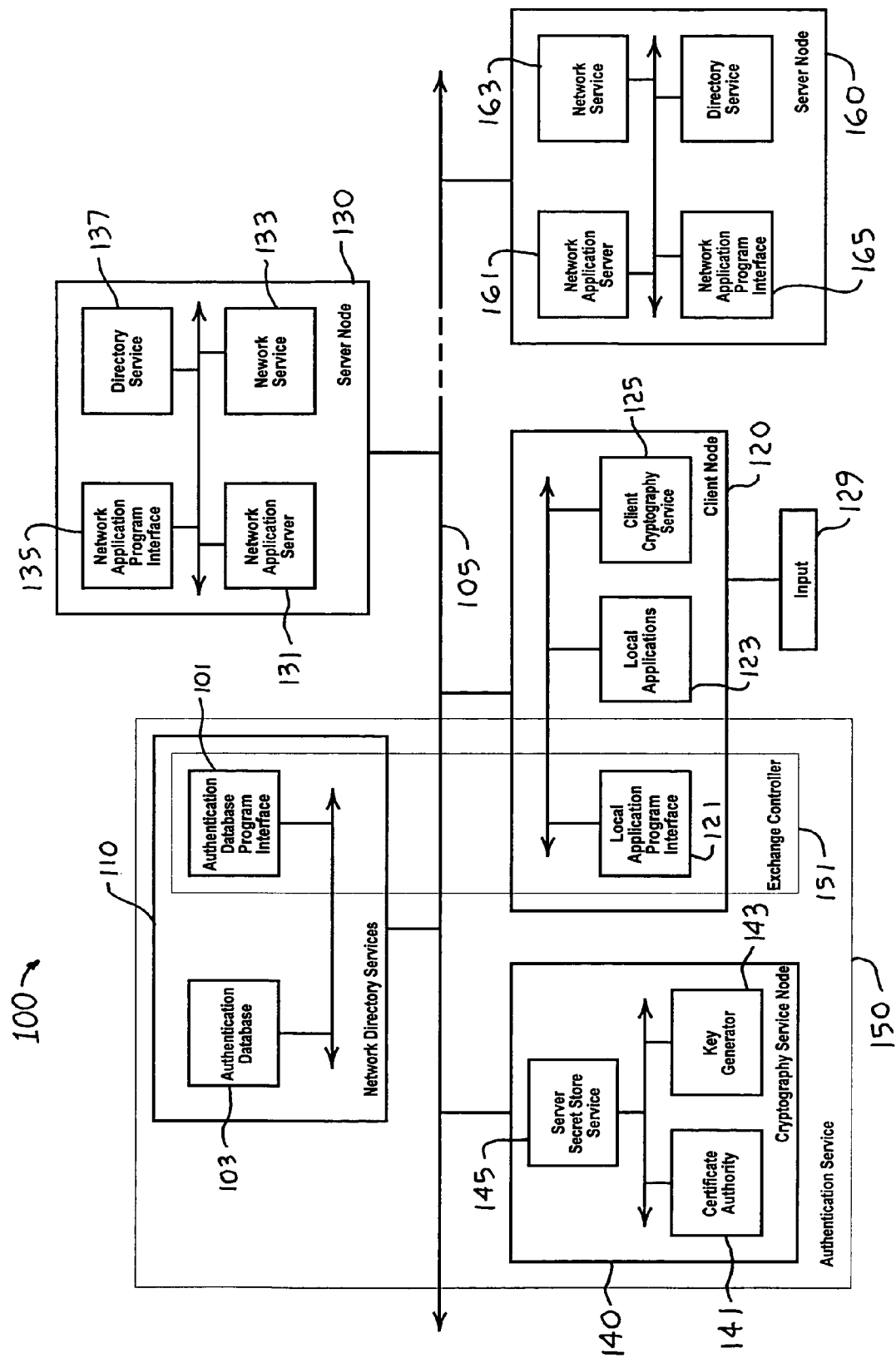
FIG. 2 is an embodiment of a distributed authentication system in accordance with the present invention.

An illustrative embodiment of a distributed authentication system 100 of the present invention is shown in FIG. 2. The distributed authentication system 100 includes a network directory services 110, a client node 120, a server node 130, and a cryptography service node 140 interconnected by a communication medium 105. The client node 120 includes a local applications 123 and a client cryptography service 125. The cryptography service node 140 includes a certificate authority 141, a key generator 143, and a server secret store service 145. The distributed authentication system 100 may further include additional client nodes (not shown) and additional application servers, such as exemplified by a server node 160.

The client node 120 functions as an interface between the user and the network applications and services requested by the user via an input device 129. In the example provided, the client node 120 can access both a network application server 131 and a network service 133 via a network application program interface 135 resident in the server node 130. Preferably, a directory service 137 is provided in the server node 130. In the configuration shown, the client node 120 can also access one or more additional applications and services, exemplified by the access to a network application server 161 and a network service 163 via a network application program interface 165 in the server node 160.

The key generator 143, which is an example of a specialized server application, is used to register a user in the distributed authentication system 100 by creating an account that includes the user identity and the user secret. The key generator 143 also functions to provide encryption keys used to encrypt or decrypt data by either: i) generating an encryption key by a random selection process, or ii) utilizing the encryption key and password provided by the user. Accordingly, it is necessary that the certificate authority 141 receive the encryption key provided by the key generator 143 by a reliable method so that the certificate authority 141 may cryptographically bind the user encryption key with the user identifier in a signed 'certificate.' This certificate and the user encryption key are saved in the network directory services 110 along with other user information.

The distributed authentication system 100 further includes an authentication service 150 that automates the authentication exchange between the input device 129 and the network application server 131, for example. The authentication service 150 includes an exchange controller 151 coupled to an authentication database 103 resident in the network directory services 110. An authentication database program interface 101 manages the authentication database 103 in response to queries generated by the client node 120. The authentication database 103 is preferably a novel secure database including a plurality of user objects and one or more groups of application authentication secrets for pre-determined application programs associated with authenticated users, as explained in greater detail below. In the configuration shown, the distributed exchange controller 151 includes the authentication database program interface 101 and a local application program interface 121 resident in the client node 120. Preferably, the authentication database program interface 101 and the authentication database 103 reside in the network directory services 110. As can be appreciated by one skilled in the relevant art, the distributed exchange controller 151 may alternatively include the network application program interface 135 with the local application program interface 121, or may include the network application program interface 165 with the local application program interface 121.

Figure 3:
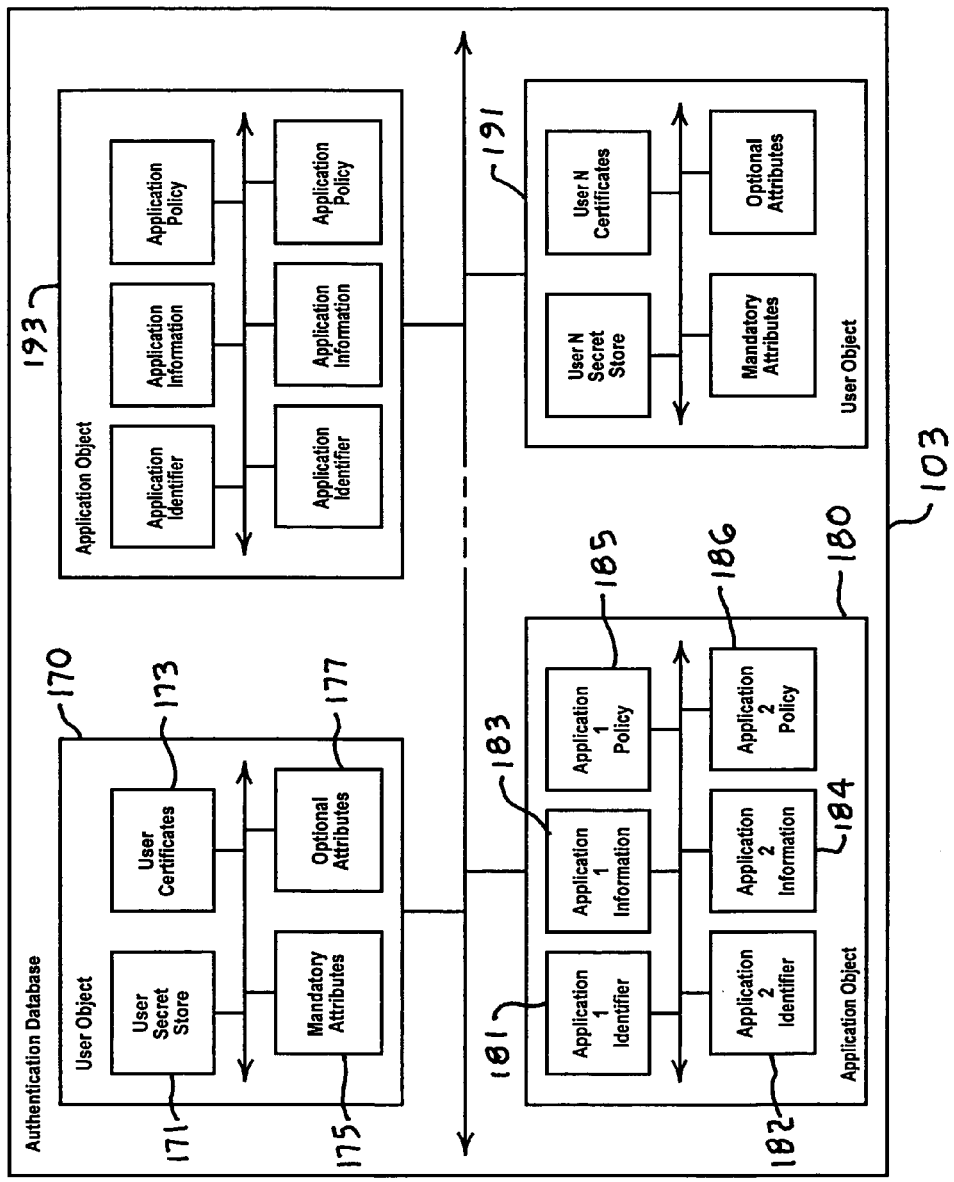
FIG. 3 is a schematized block diagram of the authentication database used in the distributed authentication system of FIG. 1.

FIG. 3 is a schematized block diagram of the authentication database 103 which includes a user object 170 and an application object 180. It should be understood that the authentication database 103 will typically include one or more additional user objects, exemplified by a user object 191, and one or more additional application objects, exemplified by an application object 193. The user object 170 includes a user secret store 171, a set of user certificates 173, a set of mandatory attributes 175, and may further include a set of optional attributes 177. The mandatory attributes 175 include a login encryption key and a secret (e.g., the hash of the password) for every valid network user. The user object 170 is accessed by the network directory services 110 when initially authenticating a valid user in the process of logging on.

When logging on, client node 120, in FIG. 2, is issued a set of credentials allowing it to access other directory services during subsequent communications with the server holding the directory partition which includes the user's object, as discussed above. Subsequent to this issuance, the client cryptography service 125 requests a session key for the connection to the server holding the directory partition. The server will issue a session key for symmetric cryptography, or a set of keys for asymmetric cryptography, between the client node 120, where the user has logged on, and the server holding the directory partition. The session key(s) can be subsequently used to secure the communication of the sensitive data between the client and the server that holds the directory partition.

The application object 180, in FIG. 3, includes one or more application identifiers, such as a first application identifier 181 and a second application identifier 182. A first application information 183 and a first application policy 185 are associated with the first application identifier 181. The first application policy 185 may include one or more of the following components: i) a set of mandatory access rights, ii) a set of discretionary access rights, and iii) a list of users authorized to use the application with different authoritative roles. A second application information 184 and a second application policy 186 are similarly associated with the second application identifier 182.

The first application program identifier 181 and the second application program identifier 182 are each a unique character string that respectively identify the first and second application programs. Although the identifier is typically supplied by the application developer, a pre-assigned program set of identifiers is reserved for any local or network application programs that may not have had manufacturers identifiers assigned. The uniqueness of these pre-assigned identifiers is assured by a network administrative authority so as to prevent the occurrence of a 'name collision' when a new network application program is being identified. The administrative authority functions to assign, issue, and register these pre-assigned application identifiers. In a preferred embodiment, each pre-assigned identifier is ASN.1-compliant and defined as a 'Free Form Identifier.'

The first application policy 185 associated with the first application identifier 181 is preferably configured so as to be defined by the administrative authority for the corresponding application. When an application authentication secret is added to the user secret store 171, for example, a lookup is performed in the network directory services 110 for the related application object. If the corresponding application identifier is found, this indicates that one or more corresponding policies should be assigned. This is accomplished by obtaining the assigned policies associated with the application identifier and copying these policies to the application policy (e.g., first application policy 185) associated with the corresponding application authentication secret in the user secret store 171. If no assigned policies are found, the application information (e.g., first application information 183) will assign a default generic policy to the corresponding application authentication secret.

Figure 4:
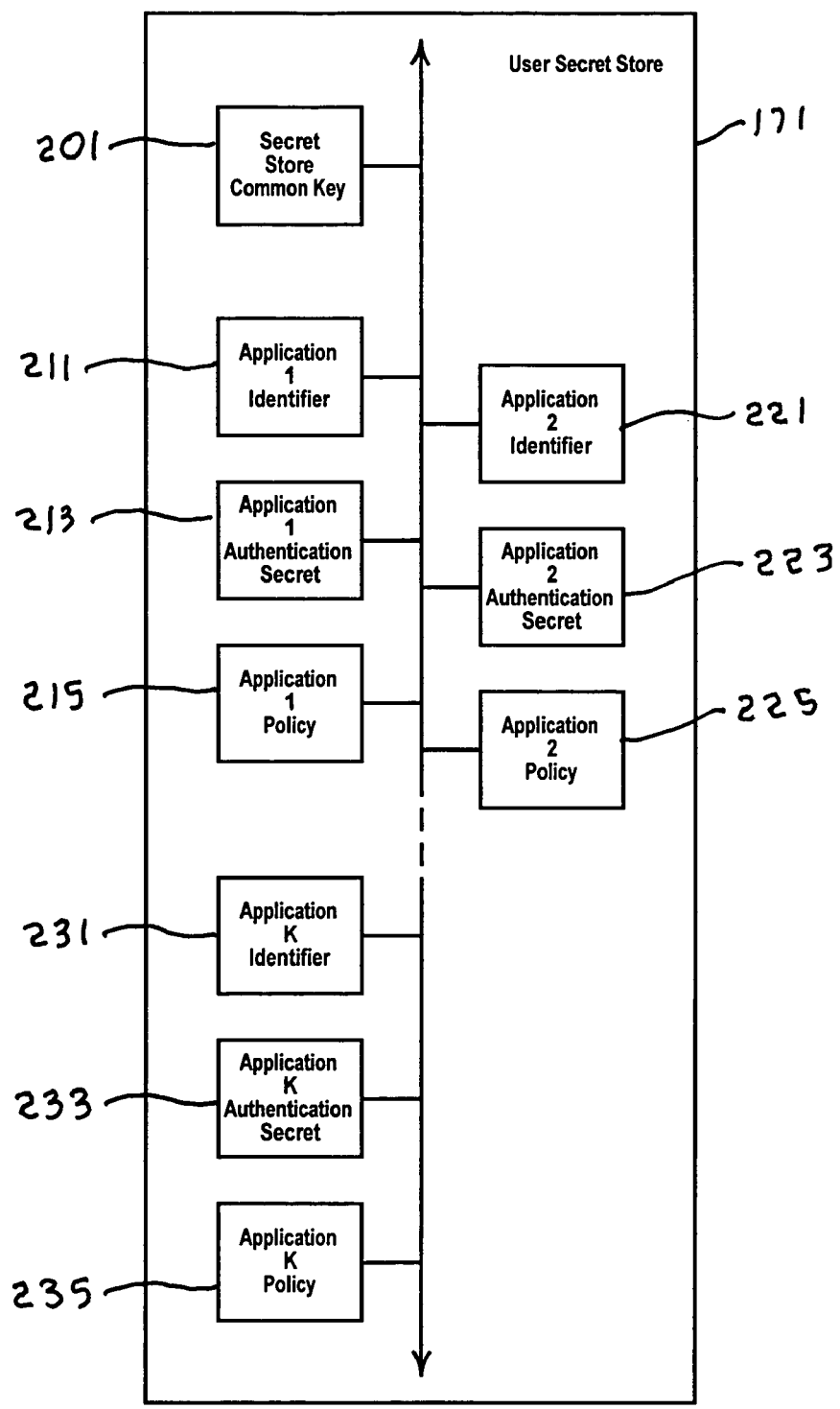
FIG. 4 is a schematized block diagram of a user secret store used in the authentication database of FIG. 3.

As shown in FIG. 4, the user secret store 171 includes a secret store common key 201 and one or more application identifiers, exemplified by a first application identifier 211, a second application identifier 221, and a $k^{th}$ application identifier 231. In the example provided, a first application authentication secret 213 and a first application policy 215 are associated with the first application identifier 211. Similarly, a second application authentication secret 223 and a second application policy 225 are associated with the second application identifier 221, and a $k^{th}$ application authentication secret 233 and a $k^{th}$ application policy 235 are associated with the $k^{th}$ application identifier 231. Preferably, the application secrets 213, 223, and 233 are different from one another. When stored in the user secret store 171, the application authentication secrets 213, 223, and 233 are encrypted by means of the secret store key. When any of the application authentication secrets 213, 223 are requested from the user secret store 171, the requested secret is first decrypted using the secret store key and then encrypted for transmittal using a different key and algorithm, as described in greater detail below. Note that the application identifiers 211 and 221 in the user secret store 171 correspond to the application identifiers 181 and 182 in the application object 180, respectively. Similarly, the application policies 215 and 225 correspond to the application policies 185 and 186, respectively.

The application authentication secrets 213, 223, and 233 contain data used by the authentication program to authenticate the client for the respective application programs and may be grouped according to the associated policies. For example, one application may allow a user to effect modifications, while another application may require administrative rights before allowing modification by a user. Preferably, the application authentication secret is the user password for the corresponding application program, but the application authentication secret may be any type of secure identification mechanism.

The application identifiers 211, 221, and 231 are used in the user secret store 171 to retrieve the secret associated with the respective application. The first application identifier 211, for example, is provided to the local application program interface 121 when the client node 120 requests access to the corresponding first application program. At the time of installing an application program in the distributed authentication system 100, the system administrator can use the application identifier to define policies and other information associated with the corresponding application program. For example, the first application program may be defined as an e-mail application. In the first application policy 185, for example, there may be provided a list of the users authorized to use the first application program, or the type of user clearances required.

When a new user initially stores the first application secret 213, the user secret store 171 uses the first application identifier 211 to look up the corresponding first application policy 215. The application object 180 first validates the new user and validates the user's rights based upon the first application policy 185 and the security clearance required for the new user. A copy of the first application policy 185 is stored as the first application policy 215 in the user secret store 171. When the user accesses the first application secret 213 in subsequent sessions, the secret store inspects the first application policy 215 before granting the user access to the corresponding first application.

The application object 180 provides a network administrator with a location in which to define the application attributes resident in the application policies for multiple users. As an application program is installed in the distributed authentication system 100, such attributes are defined by the network administrator and are added to the application object 180. This saves the network administrator the task of entering the attributes into multiple user secret stores individually. These attributes, or policy labels, are updated on the application authentication secrets from time to time by the user secret store, as determined by the network administrator. During such updates, any recent changes made in the application object 180 will be similarly updated in the respective user secret stores.

Figure 5:
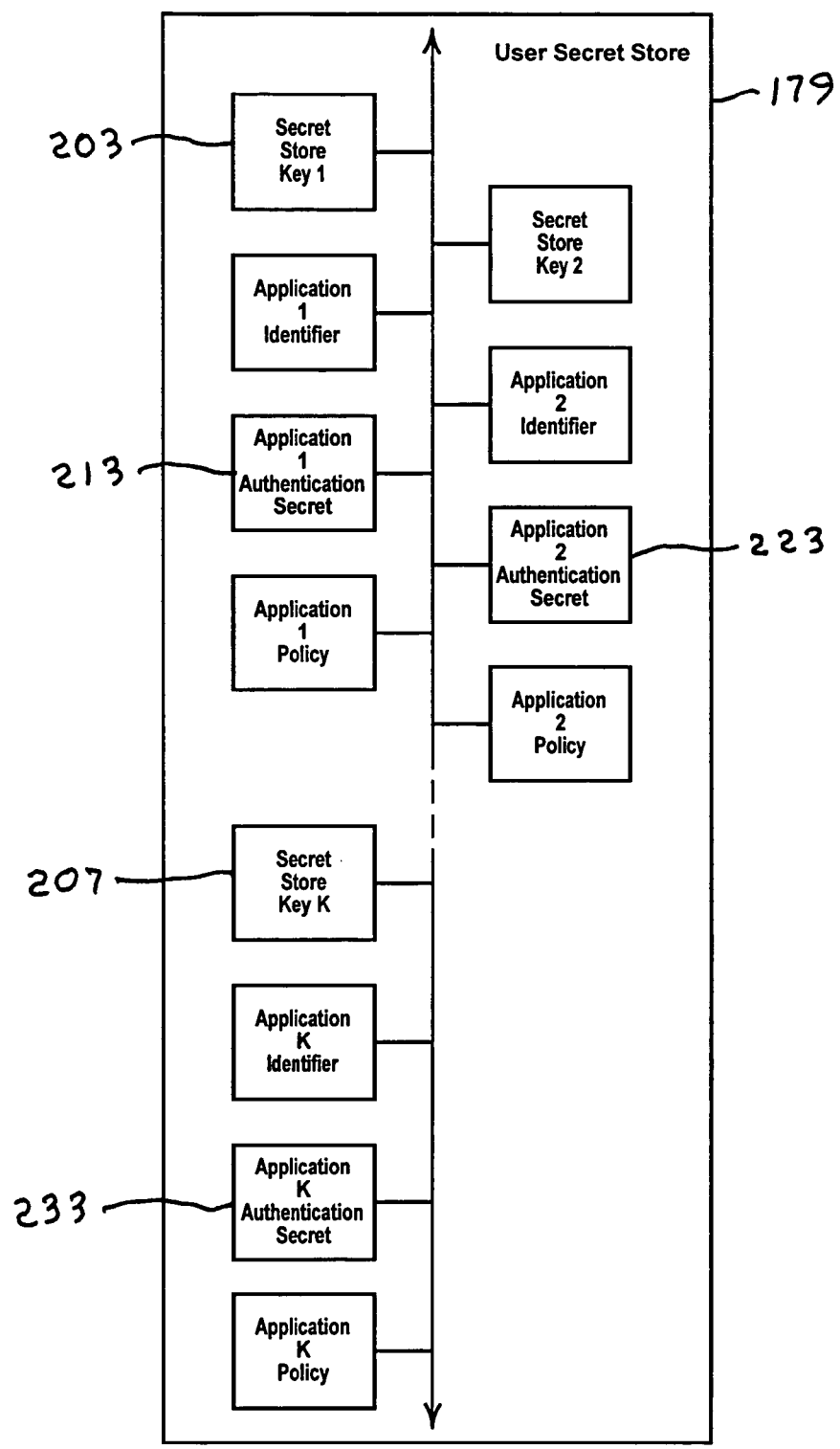
FIG. 5 is an alternative embodiment of the user secret store of FIG. 4.

The secret store common key 201 is used to symmetrically encrypt and decrypt the application authentication secrets 213, 223, and 233, as described in greater detail below. In an alternative embodiment, shown in FIG. 5, a user secret store 179 includes a different symmetric key for each application authentication secret. Thus, a first secret store key 203 is used to encrypt the first application authentication secret 213, a second secret store key 205 is used to encrypt the second application authentication secret 223, and a $k^{th}$ secret store key 207 is used to encrypt the $k^{th}$ application authentication secret 233. As can be appreciated by one skilled in the relevant art, the symmetric encryption process used in the user secret store 171 and the user secret store 179 allows for a stronger encryption and better performance than a conventional system which uses asymmetric encryption for protection of authentication secrets.

Authentication of a Network Application Client

The process of authenticating an application client can be described with reference to FIG. 6 which is a flowchart of the functions performed by the local application program interface 121 in response to a client request to access a network resource. By way of example, a user may select an application program resident in the network application server 131 by 'double clicking' on the corresponding application icon appearing on the client workstation monitor at the client node 120. This causes the network application server 131 to issue an authentication inquiry to the local application program interface 121. This authentication inquiry is in the form of a request for retrieval of the authentication secret corresponding to the selected application program received at the local application program interface 121, at block 301.

Upon receipt of this retrieval request, the local application program interface 121 responds by inquiring whether the client is a valid network client, at decision block 303. If the client is not logged on, the local application program interface 121 denies the client access to the distributed authentication service 150, at block 304. If the client has logged on, the local application program interface 121 attempts to locate and connect to the network directory services 110, at decision block 305. Unless a connection is made, the service is not found, at block 306.

With a successful connection, the local application program interface 121 then accesses the client cryptography service 125, at block 307, and retrieves a client/server session key and algorithm, and a client-supported cryptography list. The client-supported cryptography list, which is a list of algorithm identifiers, is provided via the client cryptography service 125 as part of the network operating system, as explained in greater detail below. The session key is a strong common encryption/decryption key negotiated between the client node 120 and the server secret store service 145 when the connection is made, and is used for the duration of the user login. This procedure is disclosed in "Security Domains: Key Management in Large-Scale Systems with Application to Directories," referenced above. Providing the session key creates, in effect, an encrypted 'tunnel' between the client node 120 and the server node 130, in this example. The session key is discarded when the user logs out, and a new session key is generated at the next user session.

A call is made by the local application program interface 121 to the user secret store 171, using the identifier for the selected application program, to request the application authentication secret corresponding to the selected application program, at block 309. The request for the application authentication secret is preferably encoded in the session algorithm and key, or other network protocol element, in a manner that is well-known in the art. At this time, the client-supported cryptography list is also provided to the user secret store 171 by the local application program interface 121, at block 311.

The user secret store 171 is then expected to respond by sending the requested application authentication secret along with a common key and algorithm to the application program interface 121, at block 313. For example, if the first application identifier 211 corresponds to the selected application program, the first application authentication secret 213 is provided to the local application program interface 121. The common algorithm is an algorithm obtained by negotiation between the client node 120 and the server node 130. The client-supported cryptography list is compared with a server-supported cryptography list and the strongest common algorithm is selected. A call is then made to the cryptography service node 150 to generate a common key with related attributes for use with the selected common algorithm.

As explained in greater detail in the flowchart of FIG. 7, below, the application authentication secret 213 is encrypted using the common key and algorithm before being sent to the application program interface 121. If the local application program interface 121 has not retrieved the application authentication secret 213 as requested, the process continues to block 323. Otherwise, the local application program interface 121 uses the client/server session key and algorithm to decrypt the common key, at block 315. The decrypted common key is then used to decrypt the client identifier and application authentication secret 213, at block 317, which are subsequently returned to the selected application program for validation, at block 319. The client is then provided with the selected application program or service, at block 321.

If the user has changed his secret from the previous session, no application authentication secret will be retrieved. If the local application program interface 121 does not retrieve the application authentication secret 213 using the application identifier, at block 313, a request for the application authentication secret 213 is sent to the client node 120, at block 323, by prompting the user for his secret. An inquiry is made to the first application policy 215 as to whether the requesting client has been authenticated to the selected application program, at block 325. If not, service is denied, at block 326. Otherwise, the application authentication secret 213 provided by the requesting client is copied, at block 327, to the user secret store 171 in a process described in greater detail below, and the selected application program is made available to the client, at block 329.

Figure 6A:
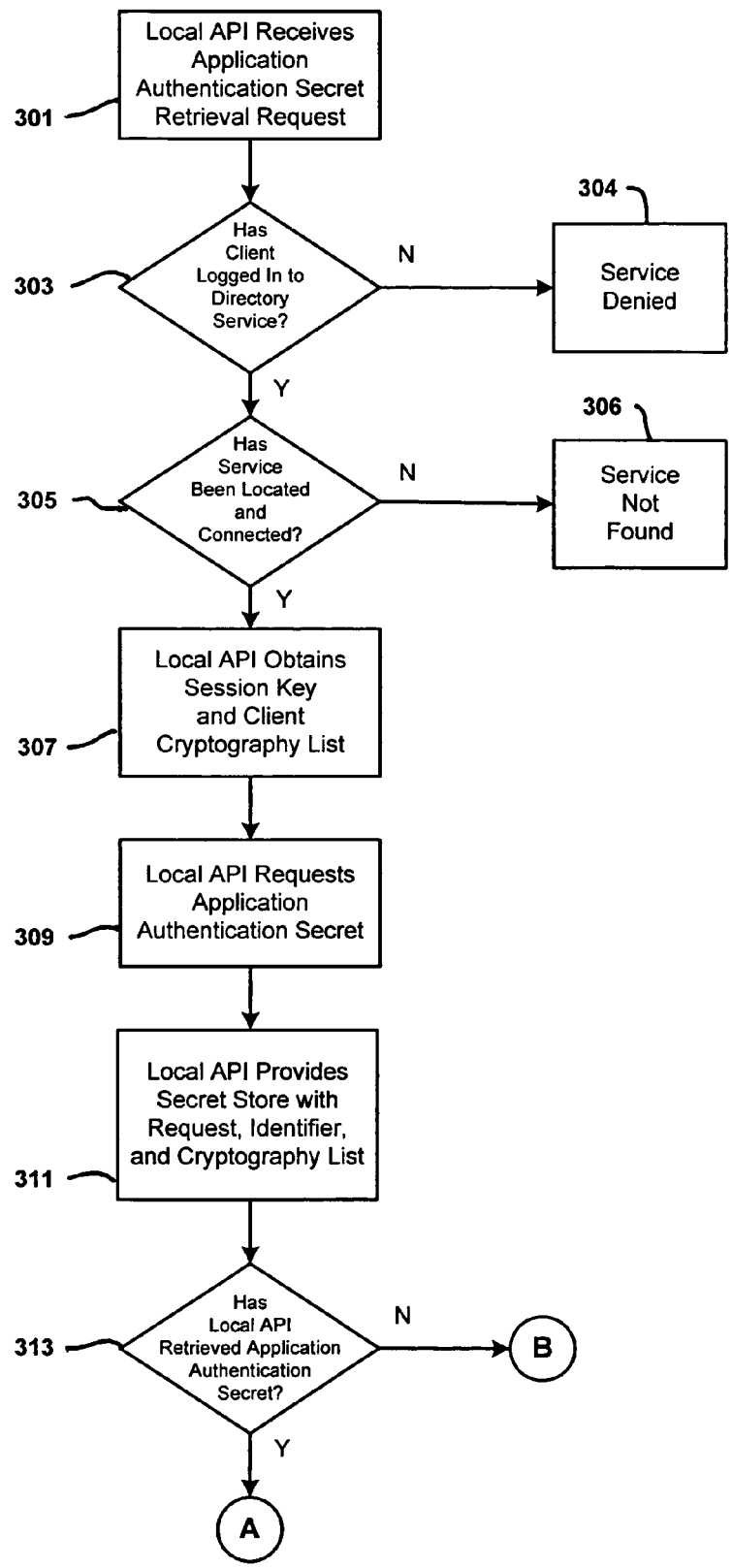
FIG. 6 is a flowchart of the functions performed by the local application program interface of FIG. 1 in response to a client request to access a network resource.
Figure 6B:
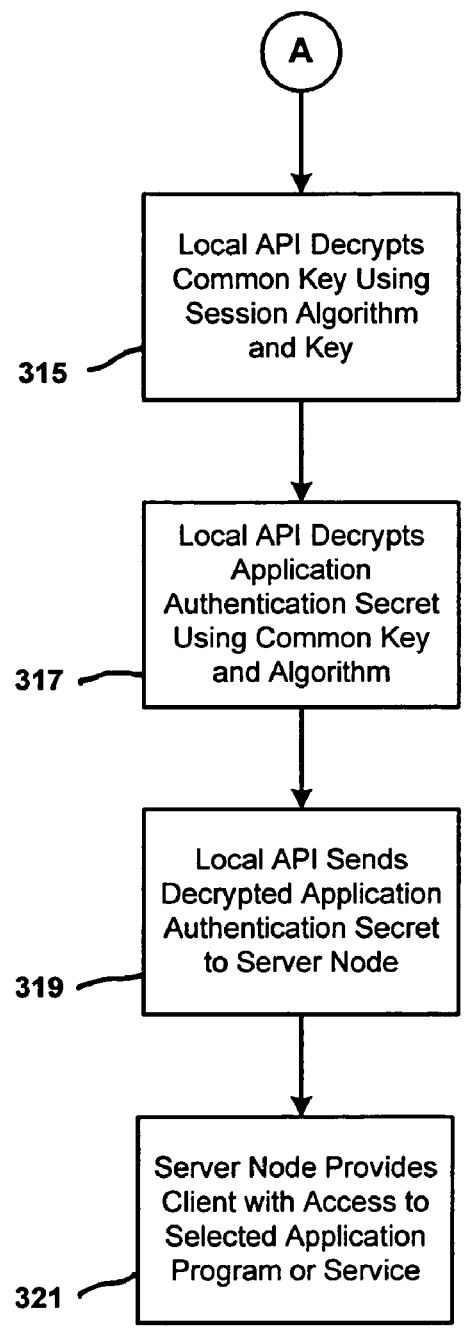
Figure 6C:
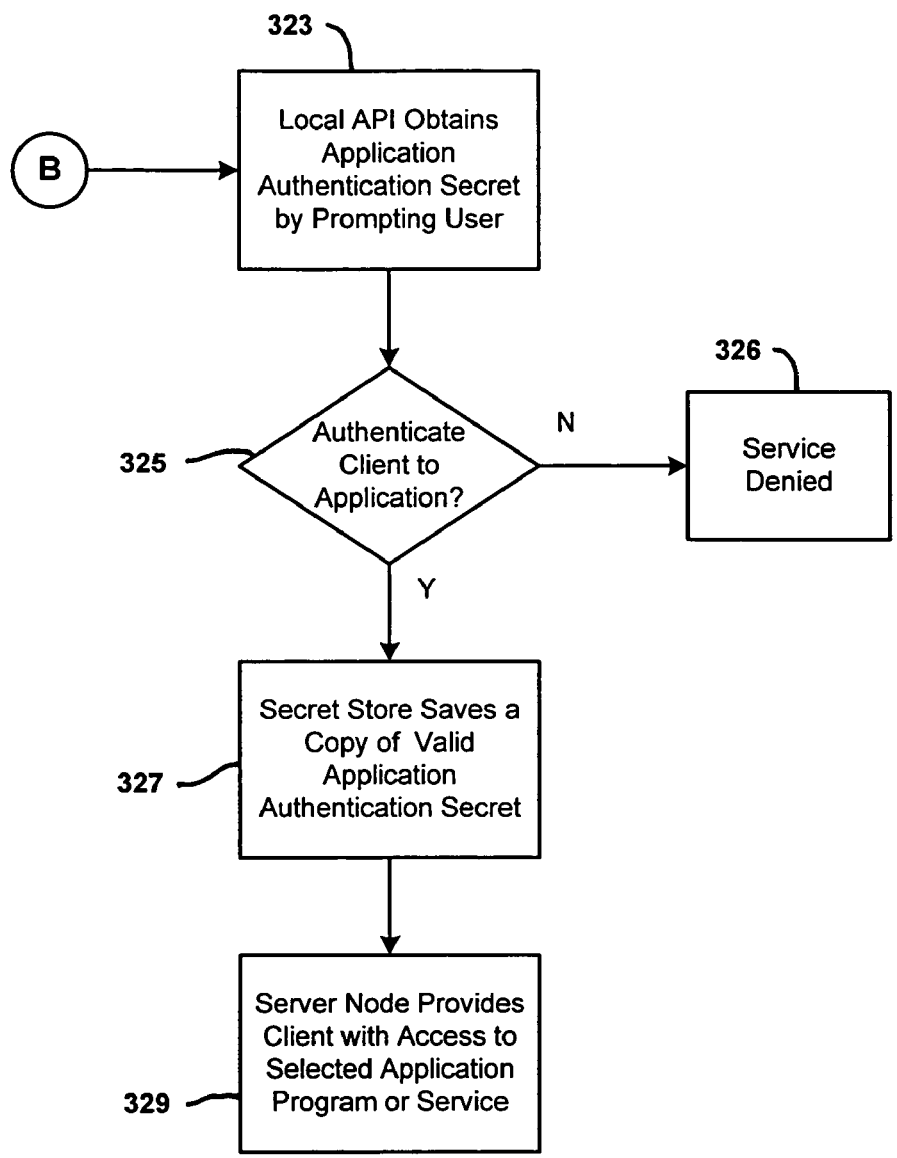
Figure 7A:
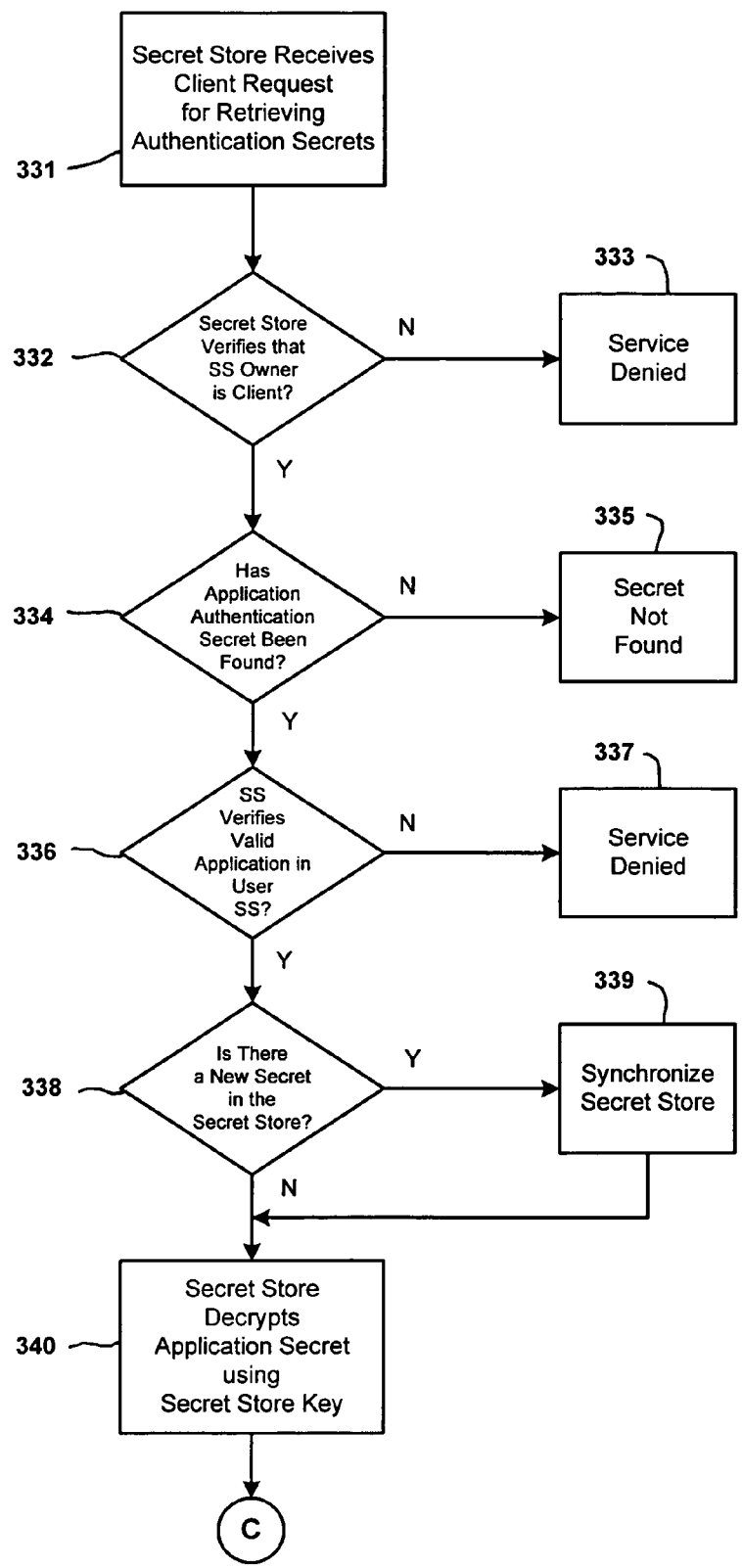
FIG. 7 is a flowchart showing in greater detail the functions performed at decision block 313 of the flowchart of FIG. 6.
Figure 7B:
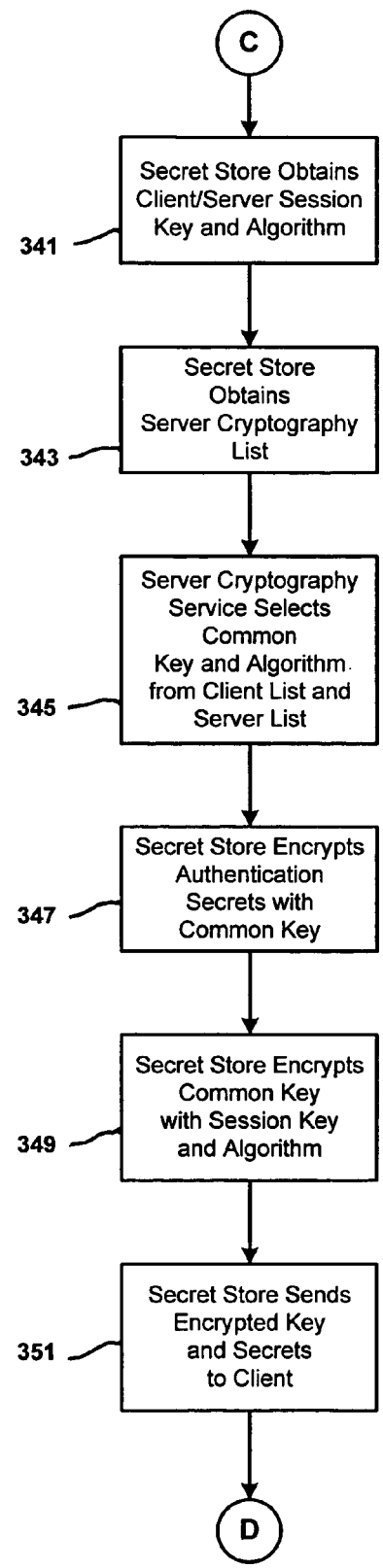
Figure 7C:
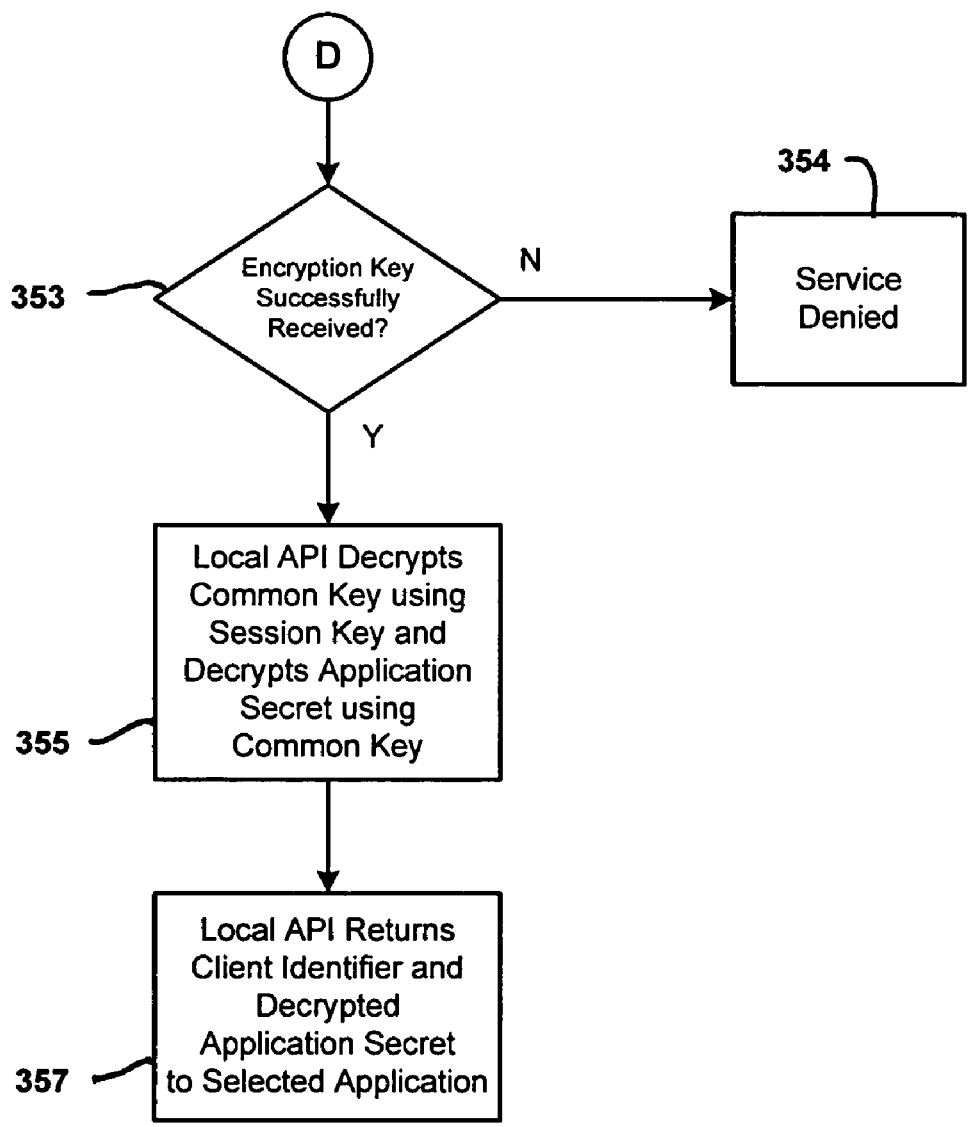

FIG. 7 is a flowchart showing in greater detail the functions performed at decision block 313 of FIG. 6, above. The user secret store 171 receives the request for the first application authentication secret 213 from the local application program interface 121, at block 331. As explained above, the user secret store 171 includes one or more application authentication secrets, each secret correlated to a corresponding application identifier. When the request for an application authentication secret is made to the user secret store 171, the corresponding application identifier is provided with the request. Internal to the user secret store 171, the application authentication secret is stored encrypted in a secret store key. When sending out data, the user secret store 171 first decrypts the stored data using the secret store key, and then encrypts the data using the common key and algorithm before sending out the requested data.

An attempt is then made to verify that the client is the owner of the user secret store 171, at decision block 332. This is accomplished by obtaining the identity of the user on the client node 120 from the authentication credentials associated with the connection to the server holding the directory partition. Subsequently, the connection identity obtained from the credentials is compared against the identity of the target user object for the operations. If these identities match, the client is verified as the owner of the user secret store 171 and operation continues.

If the client is not verified as the owner of the user secret store 171, as may be the case when a network administrator is seeking access to the user secret store 171, service is denied, at block 333. If it is established that the client is the owner, the process proceeds to decision block 334 where a determination is made as to whether the selected application authentication secret 213, based on the application identifier 211, has been obtained from the user secret store 171. Service is denied, at block 335, if the application authentication secret for the selected application identifier has not been retrieved. Otherwise, an attempt is made to verify that the selected application program can validly be provided to the client by checking the data in the first application policy 215, at decision block 336. Service is denied, at block 337, if the verification fails. Otherwise, the application authentication secret is decrypted with the secret store key, at block 340.

Prior to the decryption, at block 340, a check is made on the user secret store 171 to verify whether a 'new secret storage' flag has been set, in block 338. If this flag has been set, this indicates that one or more new secrets have been added to the user secret store 171 since the previous retrieval of an application secret. The user secret store 171 is synchronized when this flag is set, and the application authentication secret is decrypted, at block 340.

Synchronization of the user secret store 171 is required for a distributed directory when there is a possibility of a network administrator and the owner of the secret store modifying the store simultaneously on two different writeable replicas of the same directory partition. Accordingly, the network directory services 110 includes a synchronization process to synchronize all of the replicas of all directory partitions with their corresponding master copies. This synchronization process includes rules for synchronizing all of the known attributes. However, the directory inherently cannot apply any synchronization rules to special attributes, such as application secrets 213, 223, and 233 in the user secret store 171, because of the unknown and encrypted formats of the special attributes. The general synchronization of the directory as whole creates an aggregate of the secrets and encrypted attributes, resulting in duplicate secrets appearing in the user secret store 171.

The user secret store 171 obtains the client/server session key and algorithm from the server secret store service 145, at block 341, and also obtains the server-supported cryptography list from the network directory services 110, at block 343. The entries in the client-supported cryptography list, obtained as described above, are compared with the entries in the server-supported cryptography list to determine the strongest cryptographic algorithm common to both client and server, at block 345. The algorithm and key thus obtained become the common algorithm and key. The authentication secrets are encrypted using the common algorithm and key, at block 347, and the common key is subsequently encrypted with the session key and algorithm, at block 349. The encrypted data, including the encrypted common key, the identifier for the common algorithm, and the encrypted application authentication secrets, are sent to the local application program interface 121, at block 351. Unless the encrypted data are successfully received, at decision block 353, service is denied, at block 354. Upon successful reception, the encrypted data are decrypted, at block 355, and the decrypted client identification and the application authentication secret 213 are returned to the requesting application program, at block 357.

As can be appreciated by one skilled in the relevant art, the encryption process used for storage of the authentication secrets (i.e., the one or more secret store keys) is effectively decoupled from the encryption process used for transmission of the application secrets over the transmission medium 105 (i.e., the common key). Thus, the secret store key(s) can be made as strong as desired even if the common key is a weaker key. As explained above, the common key is negotiated between the client and server at the time a request is made for access to a selected network resource. The strength of the negotiated key typically depends on the physical location of the client node, and may provide for a key that is weaker than the secret store key(s). For example, if the client node is physically located in a country in which strong keys are not supported, the negotiated common key will be a correspondingly weak key. In a conventional authentication system, the weaker key would be used for storage of the authentication secrets as well as for transmission of the secrets, thus incurring a greater risk of compromising the authentication secrets. The disclosed method, however, overcomes the problem associated with conventional encrypted transmission which uses symmetric and asymmetric encryption.

Figure 8A:
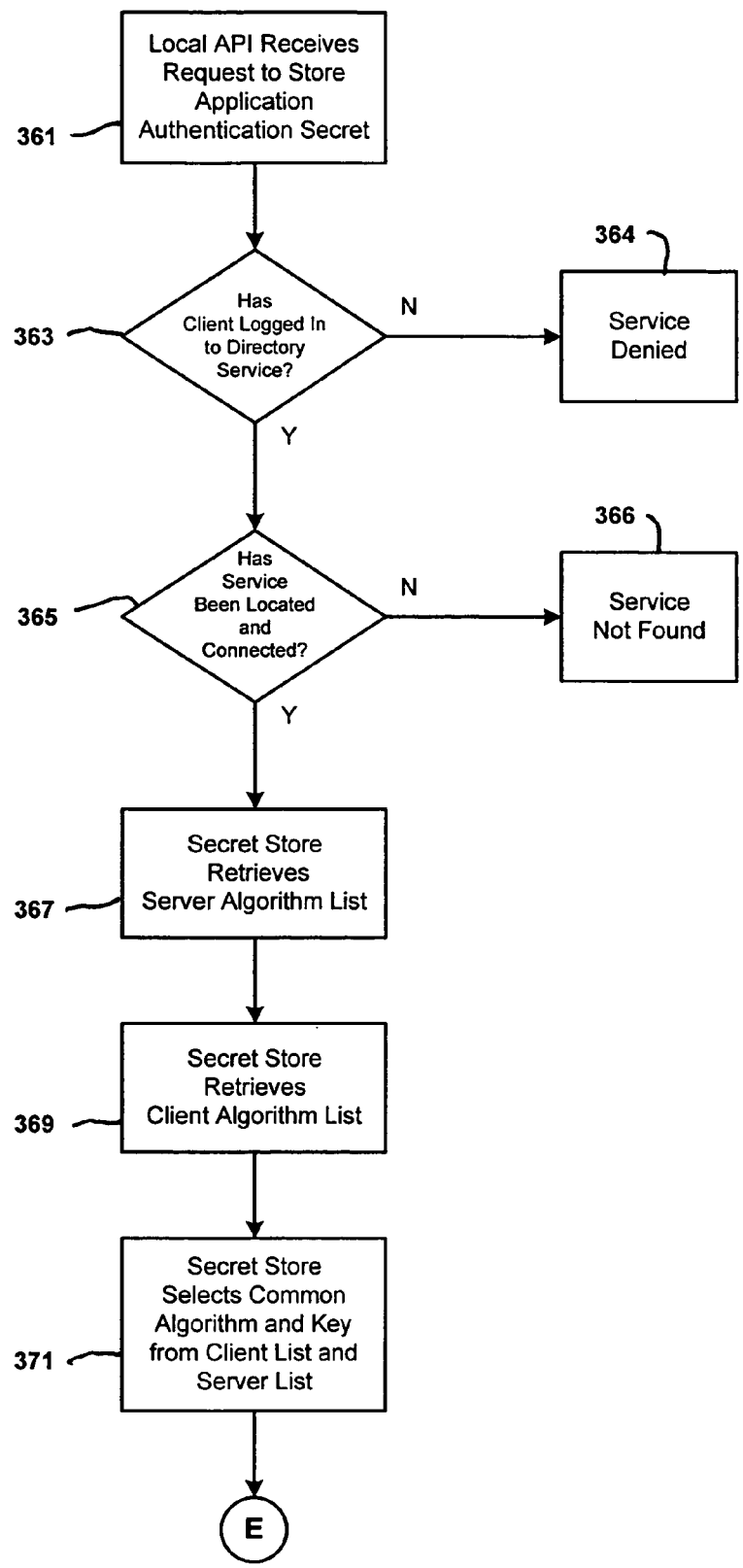
FIG. 8 is a flowchart illustrating in greater detail the functions performed at block 327 in the flowchart of FIG. 7.
Figure 8B:
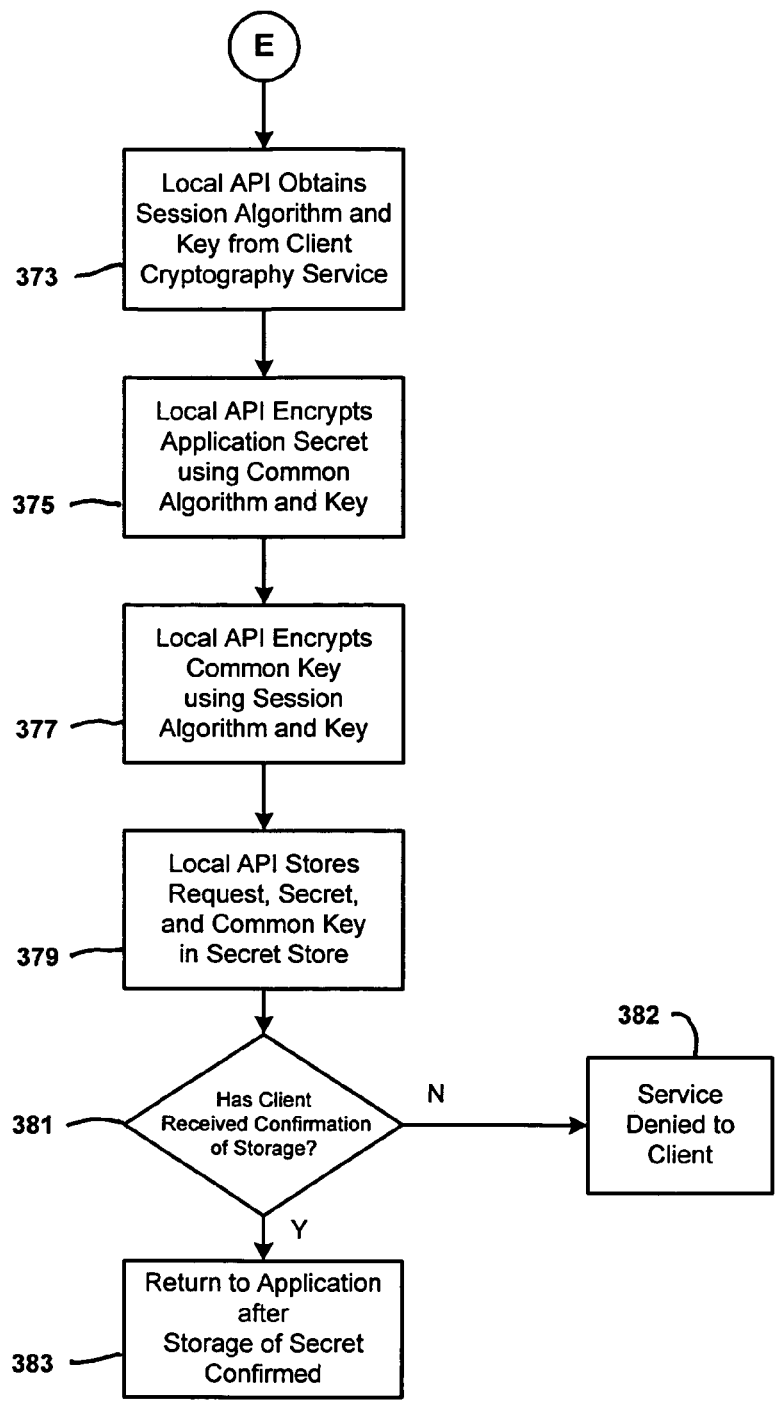

FIG. 8 is a flowchart illustrating in greater detail the functions performed by the local application program interface 121, at block 327 above, in response to a request from the client node 120 to store an application authentication secret in the user secret store 171. The request is received by the local application program interface 121, at block 361. If the client is not logged in to the network directory services 110, at decision block 363, service is denied, at block 364. Otherwise, an attempt is made to locate and connect to the service on the network, at block 365. If no connection is made, it is determined that the service has not been found, at block 366. If a connection has been made, the user secret store 171 obtains the server-supported cryptography list from the network directory services 110, at block 367, and obtains the client-supported cryptography list from the client cryptography service 125, at block 369. These lists are compared to determine the strongest algorithm common to both client and server, at block 371, and this algorithm and key become the common algorithm and key, as described above.

The local application program interface 121 obtains the session algorithm and key from the client cryptography service 125, at block 373. The application authentication secret is encrypted using the common algorithm, at block 375, and the common key is encrypted with the session algorithm and key, at block 377. The storage request, the encrypted authentication secret, and the encrypted common key are sent to the user secret store 171, at block 379. An inquiry is made, at decision block 381, as to whether the data were successfully stored in the user secret store 171, as explained in greater detail in FIG. 9, below. If the client receives a confirmation of storage, this information is passed to the selected application program and the storage is considered completed, at block 383. If no confirmation is forthcoming, service is denied to the client, at block 382.

Figure 9A:
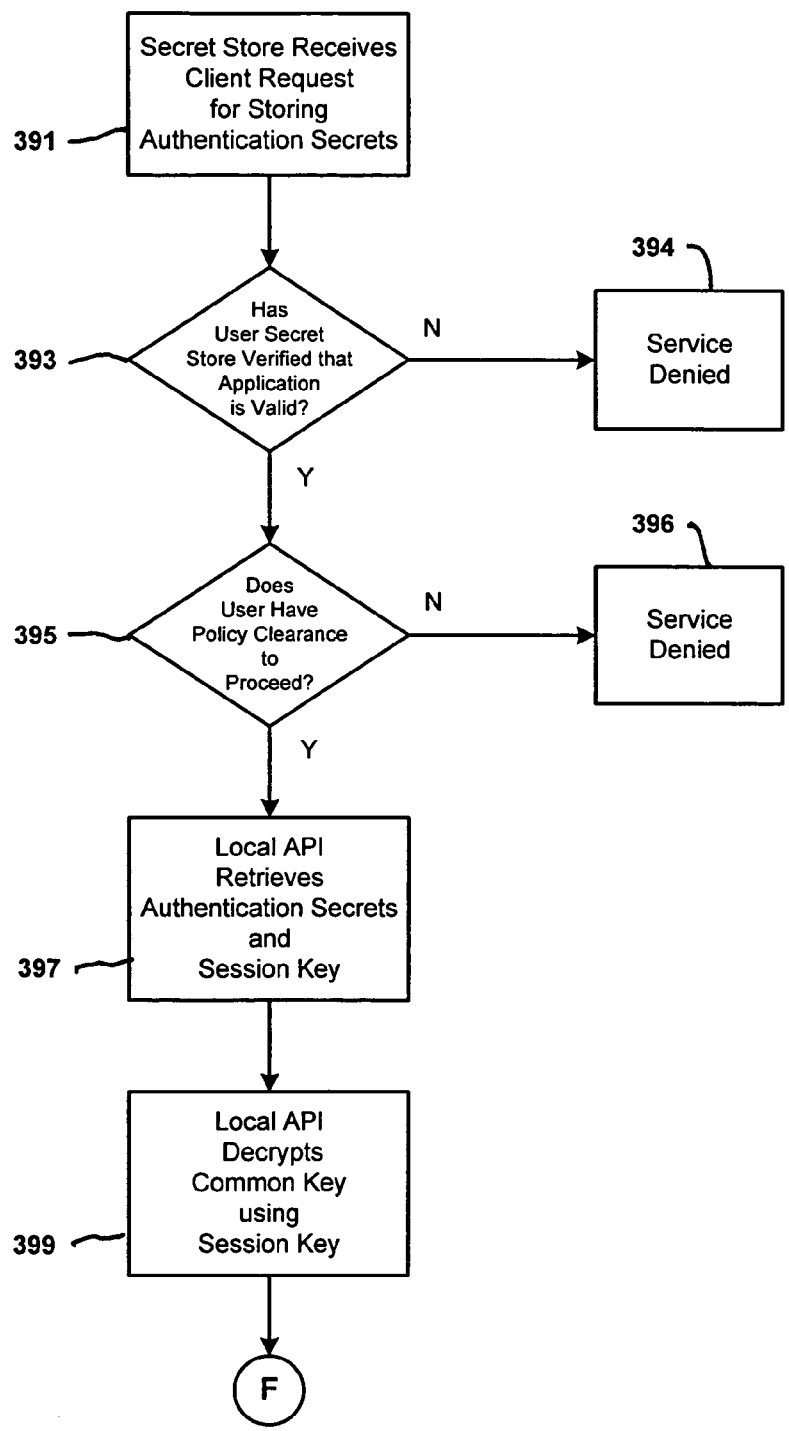
FIG. 9 is a flowchart of the procedure followed in decision block 381 of the flowchart of FIG. 8.
Figure 9B:
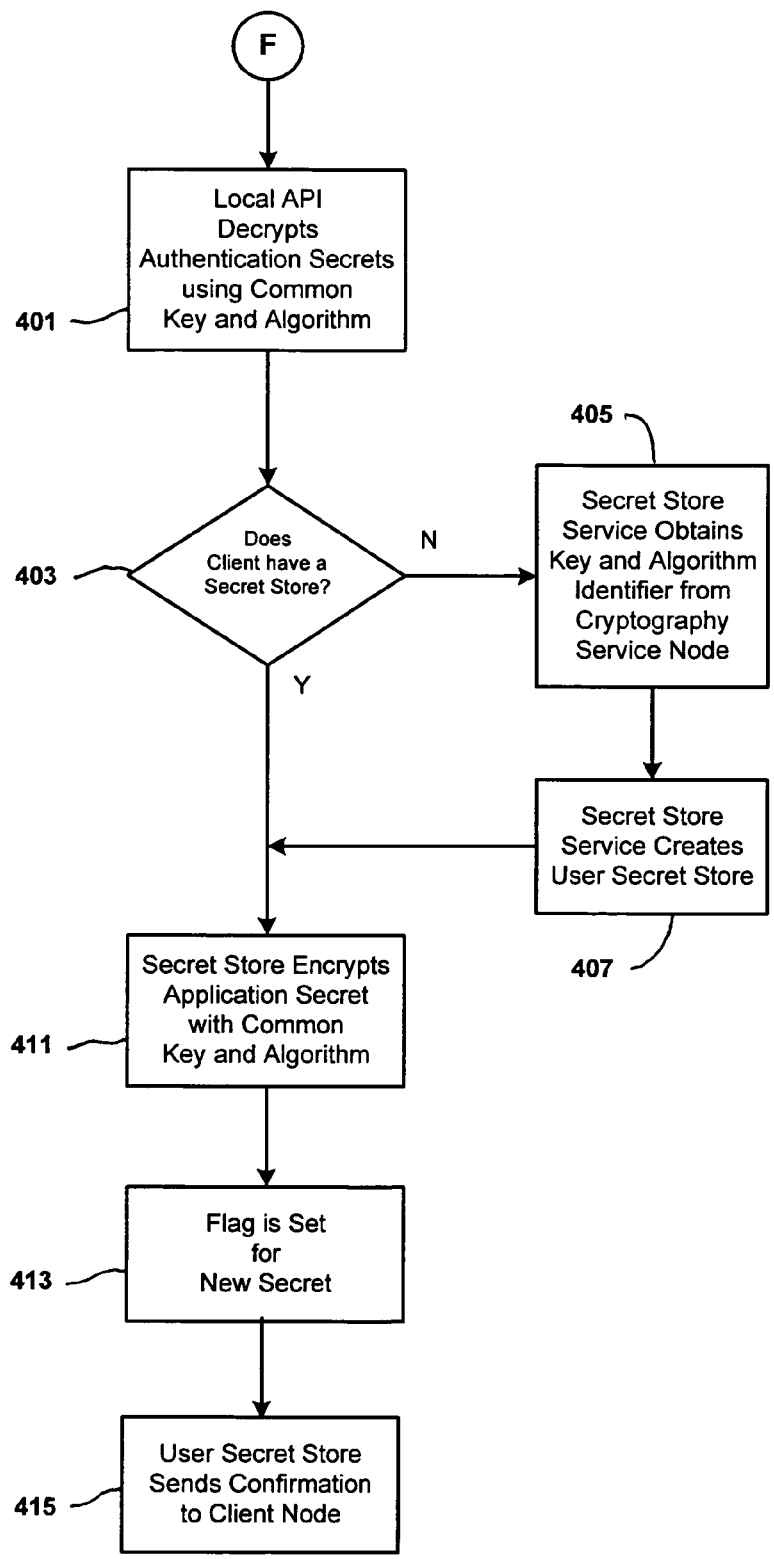

FIG. 9 is a flowchart of the storage request procedure followed in decision block 381, above. The user secret store 171 receives the request generated by the client node 120 to store the application authentication secrets, at block 391. The authentication database program interface 101 then attempts to verify that the application object 180, for example, contains the selected application identifier, at decision block 393. Otherwise, service is denied, at block 394. Then, a check is made to determine whether the user has clearance to perform the operation based on the selected application policy 215, at decision block 395. If the verification is not made, service is denied, at block 396.

If the verification is made, the authentication database program interface 101 obtains the encrypted application authentication secrets and the client/server session key and algorithm, at block 397. The client/server session key and algorithm are used to decrypt the common algorithm key, at block 399, and the decrypted common key and algorithm is used to decrypt the application authentication secrets, at block 401. Once the application authentication secrets and the client identifier have been decrypted, a check is made to determine if the client has a user secret store, at decision block 403.

If the client does not have a user secret store, the network directory services 110 obtains the strongest available encryption algorithm and key on the server for the common key and algorithm, at block 405. The server secret store service 145 creates the user secret store 171, at block 407, and the algorithm identifier and key are placed into the user secret store 171. Once the existence of the user secret store 171 has been validated, the key and algorithm from the user secret store 171 are used to encrypt the client identifier and the application authentication secret for subsequent transmittal, at block 411.

When the user secret store 171 receives the request to store new secrets, the flag is set to indicate that there are new secrets, in block 413. For the situation in which both the administrator and the owner of the user secret store 171 are adding secrets on two replicas of the directory partition, for example, a flag is set in both places. For the situation in which the new secret is being added only in one place, a flag is correspondingly set in only one place. When the directory has completed the synchronization of data, the user secret store 171 will include duplicates of the encrypted secrets, and the set flag will indicate that there are new secrets in the user secret store 171. In response, the secret store reads the new secrets and compares their respective timestamps. For every given encryption secret, the secret having the most recent timestamp is retained, and the other duplicates are discarded. Once this has been done, the directory updates the other replicas on a subsequent synchronization cycle, as described above in block 339, in FIG. 7 and, in this manner, the users secret store 171 is 'cleaned up.' The encrypted client identifier and the application authentication secret are stored in the user secret store 171 and associated with the application identifier and policy, and confirmation is sent to the client node 120, at block 415.

It should be understood that, for the alternative embodiment of the user object 170 which includes a user secret store 179 having a different encryption key for each application authentication secret, the step of obtaining the strongest encryption algorithm available with a key for the encryption algorithm, at block 405 in FIG. 9, is performed for each different application authentication secret 213, 223, and 233, regardless of whether or not the user secret store 171 had been detected or initialized.

The present invention supports intra-node as well as inter-node, server-to-server communications. In way of example, the network application server 161, in FIG. 2, or the network service 163 resident in the server node 160 may attempt to access the network application server 131 or the network service 133 resident in the server node 130. Under such circumstances, the process described above would be performed by the network application program interface 165 rather than by the network application program interface 135. As one skilled in the art would find apparent, inter-server authentication exchanges may also be performed by the distributed authentication service 150. Because the authentication exchange procedure is an internal communication process, security does not present an issue. Therefore, either the network application program interface 135 or the network application program interface 165 can be used to decrypt the pertinent application authentication secret.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An authentication system suitable for automatically providing authentication to a user at a client node, the user providing a user secret and requesting access to network resources resident at one or more server nodes in a distributed network system, said authentication system comprising:
    a local application program interface for receiving the user secret, said local application program interface in communication with a requested network resource and the client node;
    a cryptography service node including means for providing a common key and algorithm, and means for providing a client/server session key and algorithm, wherein the session key is associated with a single session during a single logon of the user and if the session terminates the session key becomes invalid; and
    an authentication database in communication with said local application program interface and with said cryptography service node, said authentication database including
    an authentication secret associated with the user;
        means for encrypting said authentication secret using said common key and algorithm; and
        means for encrypting said common key using said client/server session key and algorithm;
    wherein the local application program interface sends an encrypted authentication secret, an encrypted common key, and the session key to the client node for use with the requested network resource, and wherein the common key is a shared and same key, and wherein the use occurs during the single session of the user and expires when the single session expires.

2. The authentication system of claim 1 further comprising means for encrypting and decrypting said authentication secret using a secret store key and algorithm.

3. The authentication system of claim 1 further comprising,
    a network resource identifier associated with said requested network resource; and
    a network policy associated with the user and with said network resource identifier.

4. The authentication system of claim 3 wherein said authentication database further comprises,
    a second network resource identifier associated with a second network resource;
    a second authentication secret associated with the user; and
    a second network policy associated with the user and with said second network resource identifier.

5. The authentication system of claim 4 wherein said authentication database further comprises means for encrypting and decrypting said second authentication secret using said secret store key and algorithm.

6. The authentication system of claim 4 wherein said authentication database further comprises means for encrypting and decrypting said second authentication secret using a second secret store key and algorithm.

7. The authentication system of claim 1 wherein said cryptography service further comprises means for generating an authentication secret from the user secret.

8. The authentication system of claim 1 wherein said common key comprises a symmetric key.

9. A method for automatically authenticating a user at a network client node in a distributed network system in response to a user request for access to network resources resident in one or more server nodes, said authentication method comprising the steps of:
    providing a network resource identifier, a network resource policy, and an authentication secret to an authentication database, said network resource identifier associated with the requested network resource;
    retrieving said authentication secret in response to said user request, said authentication secret associated with the user and with said network resource identifier;
    encrypting said authentication secret with a common key and algorithm, wherein the common key is a shared and same key;
    encrypting said common key and algorithm with a client/server session key and algorithm, wherein the session key is associated with a single a session of a logon of the user and when the session terminates the session key becomes invalid; and
    sending said encrypted authentication secret and said encrypted common key to the client node for use by the client during the single session, and wherein the use expires when the single session expires.

10. The method of claim 9 further comprising the steps of:
    decrypting said encrypted common key using said client/server session key;
    decrypting said encrypted authentication secret using said decrypted common key and algorithm; and
    providing said decrypted authentication secret to the requested network resource.

11. The method of claim 9 further comprising the step of accessing said network resource policy prior to said step of retrieving said authentication secret, said network resource policy associated with the user and with said network resource identifier.

12. The method of claim 9 further comprising the steps of:
    obtaining a list of client algorithms supported by the client node;
    obtaining a list of server algorithms supported by the server node;
    comparing said list of client algorithms with said list of server algorithms so as to determine the strongest algorithm common to both said list of client algorithms and said list of server algorithms; and
    using said strongest algorithm as said common key and algorithm.

13. The method of claim 9 wherein said common key comprises a symmetric key.

14. The method of claim 9 further comprising the steps of:
    negotiating the strongest common algorithm between server and client node; and
    using said strongest algorithm as said client/server session key and algorithm.

15. A method for authenticating a client to a network resource, comprising:
    receiving a client request for a network resource;
    authenticating the client and creating a secure session;
    creating an authentication secret for access to the network resource;

encrypting the authentication secret within a common key, wherein the common key is a shared and same key;

encrypting the common key with a session key associated with the secure session, wherein the session key becomes invalid when the secure session terminates and wherein the secure session is associated with a single login session of the client; and transmitting to the client the encrypted common key, the encrypted authentication secret, and the session key for use in accessing the network resource during the single login session, and wherein the use expires when the single login session expires.

16. The method of claim 15 further comprising, determining a strongest encryption and decryption algorithm supported by the client when encrypting the authentication secret within the common key.

17. The method of claim 15 further comprising receiving, by the network resource, a decrypted version of the authentication secret from the client and authenticating the client for access to the network resource based on the decrypted authentication secret.

18. The method of claim 15 further comprising associating policies with the authentication secret, wherein the policies define access rights of the client to the network resource.

19. The method of claim 15 negotiating with the client encryption and decryption algorithms for use in encrypting the authentication secret and the common key.

20. The method of claim 15 associating the authentication secret with the client and the network resource and housing the association in a secret store for additional secure sessions established by the client.

* * * * *